Aug. 8, 1939.  A. S. MACKEY  2,168,737
DEVICE FOR DISPENSING ICE CREAM
Filed Oct. 10, 1938   2 Sheets-Sheet 1
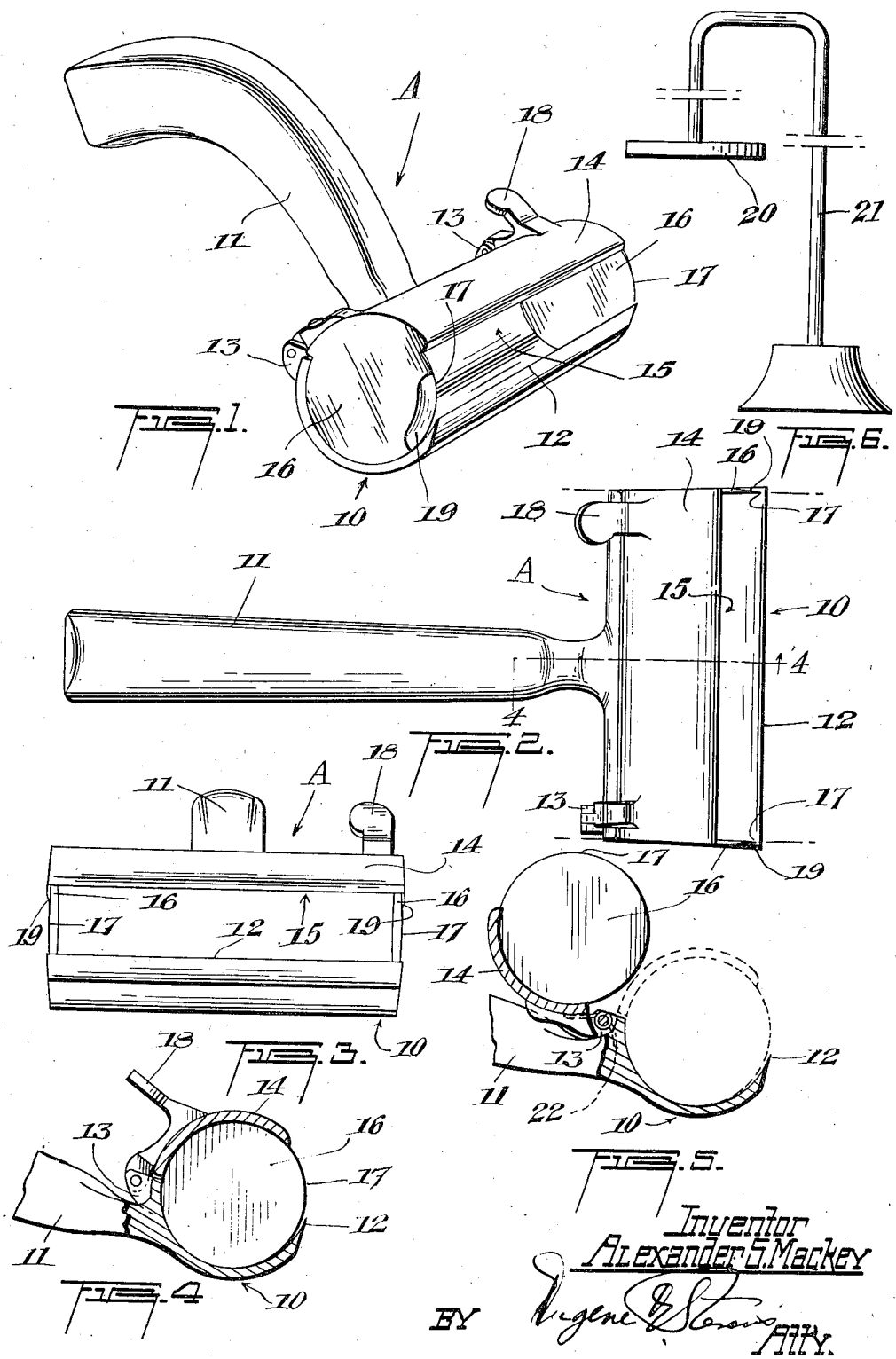
Inventor
Alexander S. Mackey Aug. 8, 1939.  A. S. MACKEY  2,168,737
DEVICE FOR DISPENSING ICE CREAM
Filed Oct. 10, 1938  2 Sheets-Sheet 2
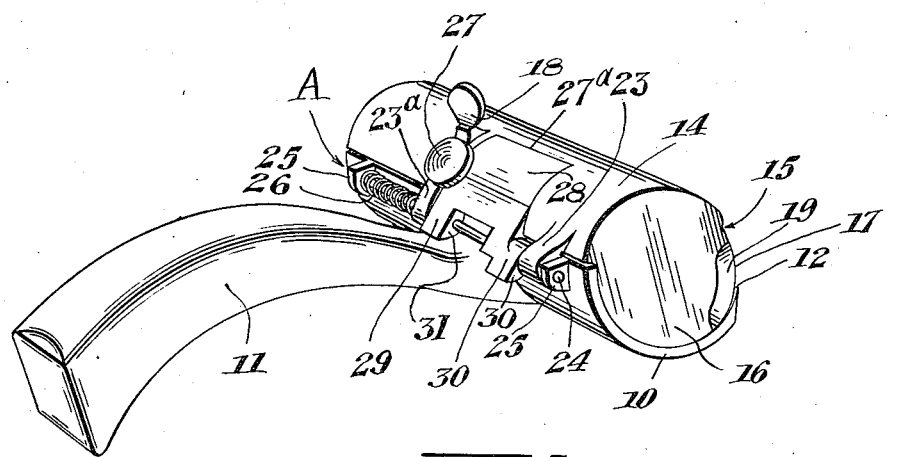
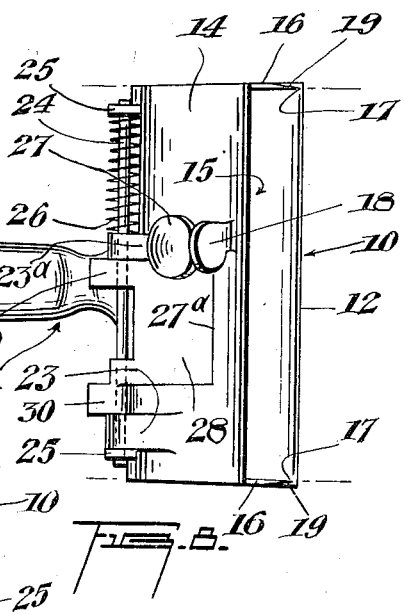
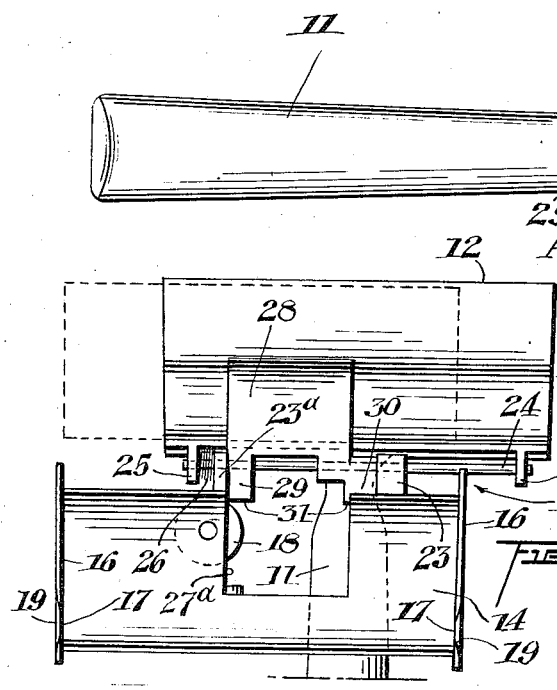
Inventor
Alexander S. Mackey
By Eugene E. Stevens
Atty.

Patented Aug. 8, 1939

2,168,737

UNITED STATES PATENT OFFICE 2,168,737

DEVICE FOR DISPENSING ICE CREAM

Alexander S. Mackey, Clearview, Ontario, Canada

Application October 10, 1938, Serial No. 234,282

13 Claims. (Cl. 107—48)

This invention relates to devices for dispensing ice cream and like materials in roll or column form.

Recently ice cream for cones has been dispensed in roll form. This is a particularly advantageous way of dispensing the ice cream in view of the fact that the roll presents a trim, clean-cut body of ice cream which may be more conveniently eaten than the ordinary cone wherein the ice cream is carried in a bulky irregular mass. Up to the present time, ice cream in roll form has been made available in paper casings and supplied to the dispenser in this form, so that not only is it necessary to unwrap the ice cream when dispensing it, but it is necessary for the dealer to keep on hand a relatively large supply of individual paper wrapped rolls in addition to bulk ice cream, which is disadvantageous.

It is an object of the present invention to provide for dispensing ice cream in roll or column form directly at the dispensing place and from the regular storage of bulk ice cream.

A further object of the invention is to provide a device through which ice cream in roll or column form may be produced as easily as using an ordinary ice cream scoop.

A still further object of the invention is to provide a device of this character whereby ice cream in roll or column form may be served, in which the rolls or columns may comprise several different flavours of ice cream.

According to the invention there is provided a scooping device having a forming member of elongated character, cylindrical in shape to produce rolls of ice cream from bulk ice cream, in which the scoop member may be manipulated, or of other suitable shape to provide a column of ice cream of relatively elongated character. The forming member generally comprises a casing connected with a handle intermediate its ends and having a cutting blade extending throughout its length in advance of the handle, positioned along one edge of an elongated opening permitting ingress to the interior of the forming member. The forming member also includes a movable flap or gate member which forms a continuation of the general wall of said member, one edge of the flap defining the opposite side of the opening, the flap or gate member including end plates connected thereto for forming the ends of the roll or column of ice cream, the flap and end plates being movable away from the roll when formed to permit it to be discharged from the forming member.

The invention will be particularly described in the following specification taken in conjunction with the accompanying drawings in which Figure 1 is a perspective view of the ice cream scooping device according to the present invention, particularly illustrating the forming member, the ingress opening thereto and the movable flap and end plates substantially in the position employed for scooping out the ice cream.

Figure 2 is a top plan view of the device.

Figure 3 is an end elevation,

Figure 4 is a section taken on the line 4—4 of Fig. 2, and

Figure 5 is a sectional detail of an alternative proposal including a spring member for retaining the flap member normally in closed position.

Figure 6 is a side elevation of a device to assist discharge of the roll or column from the forming member.

Figure 7 is a perspective view of an alternative form of scooping device wherein the movable flap is mounted on a half hinge, normally spring-pressed in position and movable axially as well as radially to discharge the ice cream, and Figure 8 is a top plan view of the structure shown in Figure 7.

Figure 9 is a top plan view of the structure with the gate member swung open and axially displaced after an ejecting operation, the holding member being shown still holding the roll shown in dotted lines.

Referring to the drawings, the invention will be generally described with reference to a scooping member to produce cylindrical rolls, and reference is first made particularly to Figures 1 to 4. As shown, A indicates the device as a whole, which is generally made up of a forming member 10 of any suitable shape to produce rolls of ice cream or like material, or columns of other suitable shape, the forming member being connected with a handle 11 at a point intermediate its ends. The forming member 10 is of generally curved character in cross section, the lower part being substantially semi-circular in cross section and connected rigidly with the handle 11. The forward edge of the lower part is designed as a cutting edge 12 and, preferably, is bevelled off from the outside as shown, to produce a cutting edge.

By means of suitable hinged members 13, a movable flap or guide member 14 is pivotally mounted on the lower portion of the form, the flap or guide member 14 being curved similarly to the lower portion, as shown in Figure 4. The outer defining edge of this flap member terminates in spaced relation from the outer cutting edge 12 of the lower part of the forming member to provide therebetween an opening 15, permitting ingress to the interior of the form. The width of the opening is of substantial proportions to permit a substantial amount of ice cream or the like to be projected into the form during a scooping operation, and the length of the opening corresponds with the length of the form.

To provide end walls for the form, end plates 16 are connected to the movable flap or gate member 14, the leading edges of the end plates being as indicated at 17, of blade-like character so as to pass through the ice cream or other material being scooped, with facility. On the flap 14, a thumb or finger lever 18 may be positioned so that a flap may readily be raised by a digit of the operator's hand carrying the handle 11. The end plates 16 are preferably bevelled or chamfered as at 19, from the outside so as to avoid undue compacting of the material within the form and preferably the ends of the forming member are inwardly tapered from the front to the back as shown by the broken lines in Figure 2 to avoid any possibility of the material adhering to the outside of the form as it is being scooped.

In employing the scoop member described, the operator with his thumb pressed upon the closure flap or guide 14, to hold it firmly in position, pushes the scoop member across the surface of the body of the ice cream, permitting the cutting edge 12 of the forming member to loosen and cut into the ice cream, whereby it will roll into a tight cylinder guided by the interior curved wall of the lower portion of the forming member and the corresponding wall of the closure flap, so that a clean-cut cylinder or roll of ice cream is formed. Upon removing the scoop from the container it is only necessary for the operator to press open the lever 18 to raise the closure flap and connected end plates away from the roll carried in the forming member so that it then can be ejected.

In the ejecting operation there may be employed a pusher member 20, in the form of a disc held on any suitable support, such as 21, the disc being of a diameter slightly less than the diameter of forming member 10. Thus, if the operator holds a cone below the forming member 10, when tilted to dispose its axis in a vertical position and brings the upper end of the roll into contact with the disc 20, the roll is projected readily into the cone.

In the case of the structure shown in Figure 5 the same general features apply, with the exception that a spring member 22 is associated with the hinge, one end being secured in the stationary part of the scoop and the other in the closure flap or a portion connected therewith, such as in the hinge structure itself, so that the flap is normally held in open position under spring pressure as shown in Figure 5, thus normally assuming ejecting position, whereas to form the rolls in the forming member it is necessary to hold the flap down in the dotted line position.

In the case of Figures 6 and 7 the same general features apply, with the exception that this structure is more automatic in character. In this connection the closure flap 14 is provided with spaced apart hinge members 23 and 23a which are disposed intermediate the ends of the flap, the hinge member 23a being spaced to a considerable extent inwardly from the end of the closure flap to which it is closest. The hinge members are mounted on the hinge pin 24 and are disposed between the spaced apart lugs 25 carried by the forming member 10.

On the hinge pin 24 disposed between one lug 25 and the hinge member 23a is a coil spring 26 which exerts a pressure on lug 23a. Since the hinge members 23 and 23a are freely mounted on the hinge pin 24, it will be realized that the closure flap is capable of an axial movement along the hinge pin. This structure may include the lever 18 as well as a dished thumb piece 27 so that once a roll of ice cream is produced in the forming member, the operator may move the closure flap 14 axially along the hinge pin 24 against the pressure of coil spring 26 until the roll has been projected axially of the forming member to a substantial degree, whereupon by depressing lever 18 to pull the flap back, the partially projected roll of ice cream may be discharged into the cone. Preferably the forming member is tapered slightly towards one end so that when the roll of ice cream is partially projected and the flap is pulled back, the roll will automatically discharge into the cone held below one end of the forming member. Upon releasing the flap the spring 26 will cause it to return to its normal position and by closing the flap the forming member may be then put into operation again to make another roll.

In order to provide against any possibility of the roll sticking between the end plates 16 of the flap and thus moving out of the forming member when the flap is turned back, a holding device may be incorporated in the structure. This may be accomplished by recessing the flap as at 27a and providing a holding apron 28 which is separate from the flap, but normally functions as a continuation of the wall of the flap. The apron 28 is provided with lugs 29 and 30 for pivotally mounting the apron on the hinge pin 24 as clearly shown in Fig. 6. These lugs are of special formation, however, and extend as at 31 to a considerable extent below the hinge pin so as to perform a further function in the operation of the device. For instance these extensions of the lugs retain the holding apron 28 from moving with the flap 14 when it is swung back on the hinge pin 24 by contacting with the handle 11 of the forming member, and also holding the device against moving independently of the flap when the roll is being formed. Thus it is apparent that the extension of the lug 29 retains the holding apron 28 from movement when the flap is in the position shown in Fig. 6, whereas when the flap is moved axially against the pressure of the coil spring 26 to project the roll partially from the forming member, as shown for instance in dotted lines in Fig. 9, the extension of the lug 30 engages with the handle 11 and prevents the holding apron 28 from moving with the flap 11 to open position as shown in Fig. 9. Consequently the holding apron 28 retains the formed roll from moving with the flap when it is swung backwardly and by permitting the flap to slide axially along the hinge pin to a point where the lugs 29 and 30 straddle the handle 11, the roll may readily be projected from the form into the cone by reason of the fact that the holding apron is then completely free upon the hinge pin 24 and does not then exert any pressure on the roll. It will be apparent, therefore, that the holding apron embodies such construction that it is rigidly held against swinging movement and in position abutting the roll during its formation and prior to its discharge, when the flap is in either of two positions and is loosely mounted so as not to perform a holding operation when the flap is in a third position.

It will be appreciated that the operating member 18 is positioned as shown in the drawings at a point where it is not only conveniently operable by the thumb of the person holding the device, but in a position where it will function as a stop member abutting the handle 11 when the flap or the gate member 14 is moved axially back towards its normal position and when it is in its backwardly swung position. Thus, the operating member will function to stop the flap at a point where the lugs 29 and 30 straddle the handle 11, leaving the holding member free, and thus permitting the discharge of the roll from the forming member. Where a spring is employed, the flap or gate member 14, of course, will be moved axially back towards normal position with a release of the pressure on the operating member, and will be automatically stopped in this movement by the operating member when the latter abuts the handle 11. However, it is apparent that it is not essential that a spring be employed since the flap or gate member 14 may be moved axially in both directions by manual operation.

Normally where the forming member is dipped in water each time before a roll is formed, there would be no tendency of the roll to move with the flap when it is swung back in the discharging operation. However, where an operator does not perform this usual preliminary measure as is followed generally in the scooping of ice cream cones, the roll formed may tend to stick and thus the structure employing the holding apron 28 obviates the difficulty so produced.

It will be appreciated, of course, that it is not necessary to employ a cylindrical form, as the form might take other cross sectional shapes, such for instance, as octagonal, etc.

It will be obvious from the foregoing description that rolls or columns of ice cream may be produced from the bulk container with facility and with no appreciably greater scooping effort than is necessary with the ordinary ice cream scoop. It will also be appreciated that multiple flavours may be produced in the one roll or column by scooping successively a portion of the ice cream to make up the roll from containers of different flavours, which will produce in the roll a pleasing colour combination.

Some changes might be made in the general structure, but it will be appreciated that the essential elements involve a form of elongated character, carried by a handle, one portion of the form being rigid with the handle and the other portion being movable, the movable portion being of a similar shape to the stationary part and being of a substantial width to permit the formation of a clean cut roll or column and providing for an opening permitting ingress of the ice cream or like material to be dispensed in a simple scooping operation.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

I claim:

1. A device for dispensing ice cream and like material in the form of rolls or columns comprising a forming member, and a handle for manipulating said member, the latter including a chamber for receiving and shaping the material defined by a suitably shaped elongated portion rigidly connected with the handle and a similarly shaped movable portion in the form of a gate member, said portions having free edges spaced apart from one another to form an opening permitting ingress of the material to the chamber, one of said edges being a cutting edge designed to loosen the material and cause it to enter the chamber of the forming member when the latter is moved across the surface of a body of the material and means in connection with said gate member, operable by a digit of the hand holding the handle, for moving said gate member away from the formed material to permit the discharge of the latter.

2. A device for dispensing ice cream and like material in the form of rolls or columns comprising a forming member and a handle for manipulating said member, the latter including a chamber for receiving and shaping the material defined by a suitably shaped elongated portion rigidly connected with the handle and a similarly shaped movable portion in the form of a gate member, having end plates designed to close the ends of the chamber, said portions having free edges spaced apart from one another to form an opening permitting ingress of the material to the chamber, one of said edges being a cutting edge designed to loosen the material and cause it to enter the chamber of the forming member when the latter is moved across the surface of a body of the material and means in connection with said gate member, operable by a digit of the hand holding the handle, for moving said gate member and carried end plates away from the formed material to permit the discharge of the latter.

3. A device for dispensing ice cream and like material in the form of rolls or columns comprising a forming member and a handle, said member including a fixed portion rigidly connected to the handle and a swingable portion normally overlying said first portion but movable away therefrom, said second portion having at least one end plate connected thereto and movable therewith, said portions having opposed edges spaced apart from one another to form an opening permitting the material to enter the forming member when the latter is moved across the surface of a body of the material, the contour of the portions of the forming member being such as to force the material introduced thereto to take a similar shape, said end plate providing a flat end on the formed material, and means in connection with said swingable portion, operable to swing said latter portion away from the formed material, to permit discharge of the latter from the forming member.

4. The device as claimed in claim 3 in which spring means is provided normally retaining the swingable portion in position overlying the fixed portion.

5. The device as claimed in claim 3 in which the swingable portion is also axially movable to move the material out of the forming member.

6. The device as claimed in claim 3 in which the swingable portion is also axially movable to move the material out of the forming member and spring means in connection wtih said portion for retaining it axially to normal position overlying the fixed portion.

7. The device as claimed in claim 2 in which the end plates are chamfered from the outside to form cutting edges over the portion of their periphery traversing the ingress opening of the forming member.

8. The device as claimed in claim 2 in which the ends of the forming member are tapered inwardly gradually decreasing the length of said member rearwardly of said opening.

9. A device for dispensing ice cream and like material in the form of rolls or columns comprising a forming member and a handle for manipulating said member, the latter including a chamber for receiving and shaping the material, defined by a suitably shaped elongated portion rigidly connected with the handle, and a similarly shaped portion in the form of a gate member, said portions having free edges spaced apart from one another to form an opening permitting ingress of the material to the chamber, one of said edges being a cutting edge designed to loosen the material and cause it to enter the chamber of the forming member when the latter is moved across the surface of a body of the material, means for mounting said gate member for swingable and axial movement relative to the other portion of the forming member, and means in connection with said gate member for engaging a roll in the forming member and for moving said roll axially of the forming member when said gate member is moved axially.

10. The device as claimed in claim 9 in which a holding member is associated with the gate member, said holding member being mounted for swingable and axial movement with the gate member and means in connection with said holding member for retaining it against swinging movement when said holding member is disposed in either of two axially adjusted positions and for releasing it for swinging movement when said holding member is in another of its axially adjusted positions.

11. A device for dispensing ice cream and like material in the form of rolls or columns comprising a forming member and a handle for manipulating said member, the latter including a chamber for receiving and shaping the material defined by a suitably shaped elongated portion rigidly connected with the handle and a similarly shaped movable portion in the form of a gate member, having at least one end plate connected thereto and movable therewith, said portions having free edges spaced apart from one another to form an opening permitting ingress of the material to the chamber, one of said edges being a cutting edge designed to loosen the material and cause it to enter the chamber of the forming member when the latter is moved across the surface of a body of the material, said gate member being mounted on the other portion of the forming member for swingable and axial movement relatively thereto, whereby upon axial movement the formed roll is partially projected from one end of the forming member by said end plate and upon swinging said gate member the latter and said plate are moved out of contact with the roll to permit its unhindered discharge from the forming member.

12. The device as claimed in claim 11 in which the gate member is recessed and the holding member is positioned in said recess, said holding member forming a continuation of a wall of the gate member and mounted on the other portion of the forming member in swingable and axially slidable relation thereto, whereby said holding member may be axially adjusted together with said member relatively to the other portion of the forming member, and means in connection with said holding member for retaining it against swinging movement when in one axially adjusted position and for permitting swinging movement thereof when in another axially adjusted position.

13. The device as claimed in claim 11 in which the gate member is recessed and the holding member is positioned in said recess, said holding member forming a continuation of a wall of the gate member and mounted on the other portion of the forming member in swingable and axially slidable relation thereto, whereby said holding member may be axially adjusted together with said member relatively to the other portion of the forming member, and means in connection with said holding member for retaining it against swinging movement when in one axially adjusted position and for permitting swinging movement thereof when in another axially adjusted position, said holding member retaining the roll against swinging movement when the gate member is swung away from the other portion of the forming member and releasing said roll when said gate member is moved axially to release the holding member, and means for stopping the axial movement of the gate member at a point in its axial movement and when swinging away from the other portion of the forming member to set the holding member in released position.

ALEXANDER S. MACKEY.